Dec. 5, 1967  F. M. SPRINGUEL  3,356,331
SHOCK ABSORBER
Filed Oct. 28, 1965  2 Sheets-Sheet 1

Inventor
Francois M. Springuel
Stevens, Davis, Miller & Mosher
Attorneys

Dec. 5, 1967  F. M. SPRINGUEL  3,356,331
SHOCK ABSORBER

Filed Oct. 28, 1965  2 Sheets-Sheet 2

Inventor
Francois M. Springuel
Stevens, Davis, Miller & Mosher
Attorneys

United States Patent Office 3,356,331
Patented Dec. 5, 1967

3,356,331
SHOCK ABSORBER
François M. Springuel, 42 Route de Genval,
Ohain, Belgium
Filed Oct. 28, 1965, Ser. No. 505,502
Claims priority, application Belgium,
Nov. 4, 1964, 655,255
10 Claims. (Cl. 248—358)

ABSTRACT OF THE DISCLOSURE

A shock absorber for mounting between two elements, and comprising a first beveled member mounted on one of the elements, at least one additional beveled member slidably mounted on the other of the elements, and spring means associated with the additional beveled member to urge it towards the first beveled member. Roller means are provided between the beveled faces of the members and are mounted for rotation about axes which are parallel to the beveled faces and which are located within planes parallel to the direction of movement of the additional beveled member on the other of the elements, so as to diminish friction between the opposed beveled faces when the beveled members move with respect to each other.

---

This invention relates to a device for mounting between two elements, one of which is loaded, and which is intended to absorb vibrations and shocks which may be transmitted from the loaded element to the other element, this device comprising a component made integral with one of said elements and having at least one face for cooperation with a face of a member, mounted on the other said element, this member being movable on the latter element against elastic means, on the one hand, under the action of the said component when the distance between the two elements is being reduced and, on the other hand, under the action of said elastic means, in order to act on the said component when the distance between the two elements increases, the face of the component and the face of the member being plane and substantially parallel, these two faces being mounted obliquely one to the other in such a manner that the direction of movement of the member shall be substantially perpendicular to the direction of the movement of said component.

It has already been considered in order to absorb vibrations and shocks to use devices made up from two or a plurality of wedges the working faces thereof supporting one another and sliding one with reference to the other. These devices have the considerable disadvantage that, because of the friction of the contacting faces, they are of slight sensitivity and unable to absorb vibrations and shocks in an efficient manner, particularly vibrations of low amplitude and short period as well as shocks of low intensity.

The object of the invention is to overcome this disadvantage and to provide a highly sensitive device so as to fully absorb vibrations and shocks independently of their amplitude, their period and their intensity.

To that end, according to the invention, roller means are provided between the component and said member.

According to the invention, roller means are provided between said member and the element on which the latter is mounted.

Briefly summarized, the present invention includes a beveled component and at least one member mounted between two elements with spring means being associated with the beveled member to urge it towards the component. Roller means are provided between the component and the member and comprises one or more rollers, the axis of rotation of this roller being parallel to said face of the component and located within a plane perpendicular to the direction of movement of the said component.

According to a particularly advantageous form of embodiment of the invention, the roller or rollers are mounted between the component and the member in such a manner that they are in contact with said faces of the component and the member, according to two diametrically opposed generating lines.

Other details and particularities of the invention will become apparent from the description of the accompanying drawings which represent by way of a non-limiting example a particular form of embodiment of the subject of the invention.

In the different figures the same reference numerals refer to similar elements.

Figure 1:
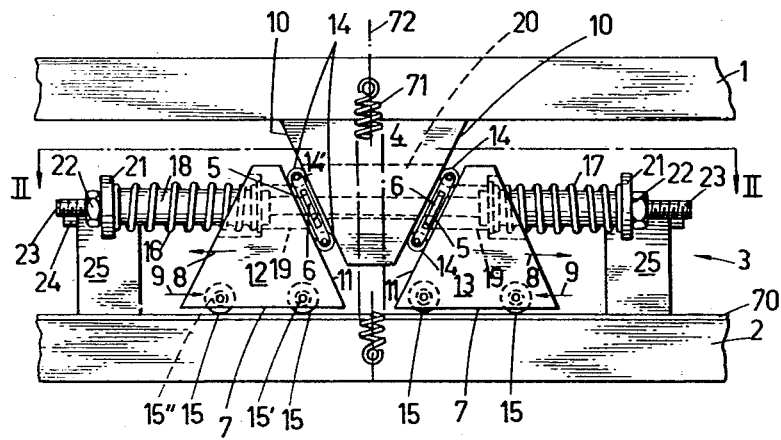
FIGURE 1 is an elevational view of a device according to the invention.
Figure 2:
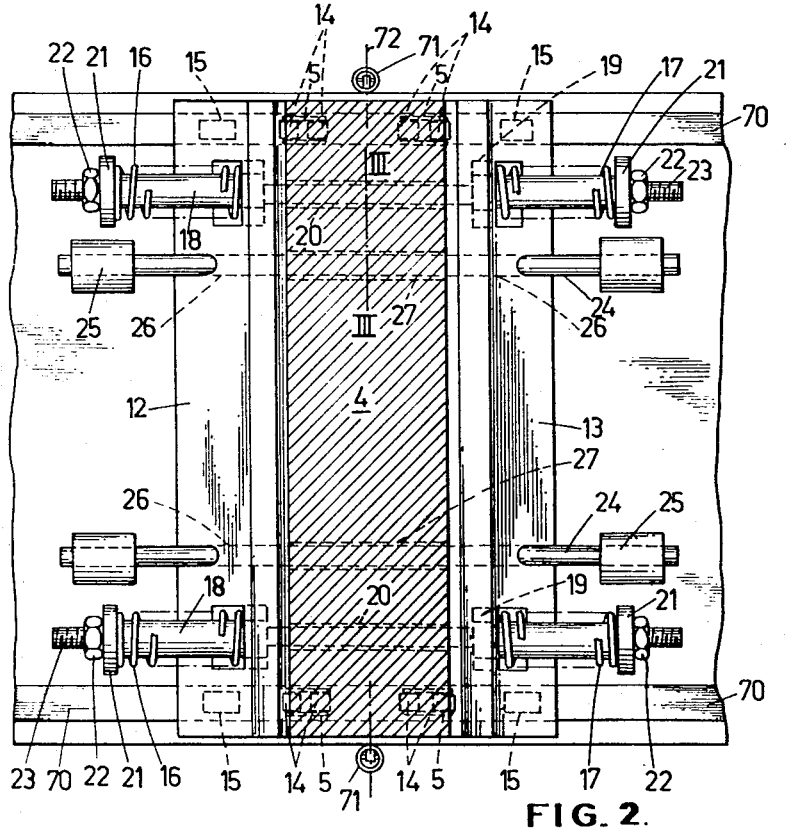
FIGURE 2 is a sectional plan view, taken along line II—II of FIGURE 1, corresponding to FIGURE 1.
Figure 3:
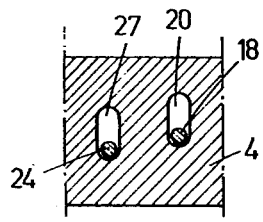
FIGURE 3 is a sectional view taken along line III—III of FIGURE 2, showing a detail of the device.

The device 3 shown on FIGURES 1, 2 and 3 comprises a component 4 and members 12 and 13 which are in the shape of prisms with bases substantially isosceles trapeziums. The component 4 is secured to the element 1 by its side face corresponding to the large base of said trapeziums. Each of the members 12 and 13 is mounted on element 2 so as to be movable on the latter against the springs 16 and 17 by its side face corresponding to the large base of said trapeziums.

The elements 1 and 2 and the device 3 are shown in the position of static equilibrium. When the element 2 is subjected to upwardly directed impacts or shocks, these impacts or shocks will result in making the element 2 rise and will tend to make element 1 rise. The element 1 remains at the moment of the impacts or shocks substantially at constant level because the power produced by the impacts or shocks is absorbed by springs 16 and 17 during the movement under the effect of component 4 and according to arrows 8 of members 12 and 13 of device 3 on the element 2. The power absorbed by said springs will be again available at the moment when the impact or shock forces are no longer applied to element 2 and at the moment when the latter goes down, members 12 and 13, applied to the component 4, will slide on element 2 in the direction of the arrows 9 which will result in maintaining component 4 in position so that element 1 will be at constant level. If impacts or shocks are applied to element 1, then element 2 will remain at constant level.

The springs 16 and 17 of the device 3 operate in contrary direction so as to apply the members 12 and 13 against component 4 and are mounted on a stem 18 which passes through openings 19 provided in the members 12 and 13 and through a bore of elongated cross-section 20 provided in component 4. Each of the springs 16 and 17 rests, on the one hand, on the members 12 and 13 and, on the other hand, on a stop 21 mounted on said stem. The bore 20 provided in the component 4 allows the latter to move according to a direction substantially at right angle to the axis of stem 18. The position of the stops 21 is adjustable by means of the nuts 22, movable on the threaded ends 23 of stem 18 so as to permit adjustment of the tension of the corresponding springs in accordance with the load borne by element 1. The members 12 and 13 are guided in their movement by stems 24 mounted in supports 25 integral with element 2. The stems 24 pass through openings 26 provided in the members 12 and 13 and through a bore of elongated cross-section 27 provided in the component 4, said bore permitting component 4 to move in a direction substantially at right angle to the axis of the stems 24.

In order to increase the sensitivity of device 3 and so as to enable the latter to absorb all vibrations or shocks, rollers 14 are provided between the faces 10 and the faces 11 of the component 4 and of the members 12 and 13, while rollers 15 are provided between the members 12 and 13 and the element 2. The axis of each of the shafts 14' carrying the rollers is parallel to said faces 10 and 11 and is located in a plane at right angle to the direction of movement of component 4. The rollers 14 are mounted so as to engage the faces 10 and 11 according to two diametrically opposed generating lines. The rollers 14 are mounted two by two inside a frame 5, the latter being provided between the component 4 and one of the members 12 and 13 and being maintained therein-between by a boss 6 of members 12 and 13. The boss 6 cooperates with the frame 5, on the one hand, so as to permit the rotation of the rollers 14 and, on the other hand, so as to prevent the movement of these rollers according to a direction parallel to the axis of rotation of the said rollers. Each of the said rollers 15 is carried on a shaft 15' the axis thereof being parallel to the face 7 of the members 12 and 13 and located in a plane at right angle to the direction of movement of these members. The shafts 15' of the rollers 15 are mounted on the members 12 and 13 by means of ball-bearings 15'', the rollers 15 rolling on the roller paths 70 provided in the element 2.

Springs 71 are advantageously provided on the device in order to apply the rollers 14 and 15 on component 4 and the members 12 and 13 as well as on the element 2. These springs 71 are mounted on either side of the device 3, the longitudinal axes of said springs being substantially parallel and being located in the symmetry plane of the said device, the trace of this symmetry plane being shown in FIGURES 1 and 2 and designated by the numeral 72. It is of course understood that the resistance of the springs 72 is less than that of springs 16 and 17.

Figure 4:
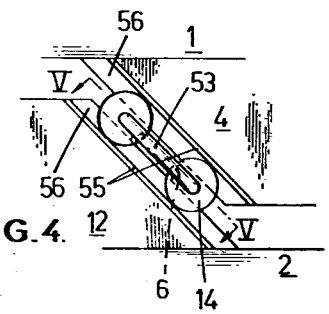
FIGURE 4 is a partial elevational view showing a form of embodiment different from that shown in FIGURE 1.
Figure 5:
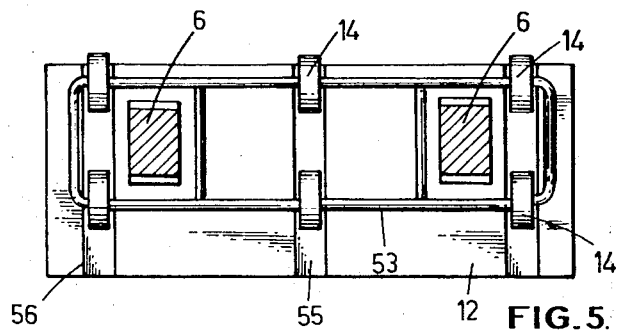
FIGURE 5 is a view taken along line V—V of FIGURE 4.

In order to reduce the dimensions of the device 3, the rollers 14 may roll in grooves 56 provided in the component 4 and the members 12 and 13 (FIGURE 4), a roller path 55 being provided in each of these grooves. The rollers 14 mounted between the component 4 and one of the members 12 or 13 may also be integral with a single frame 53 (FIGURES 4 and 5), this frame being maintained between the said component and member by bosses 6 integral with member 12.

Figure 6:
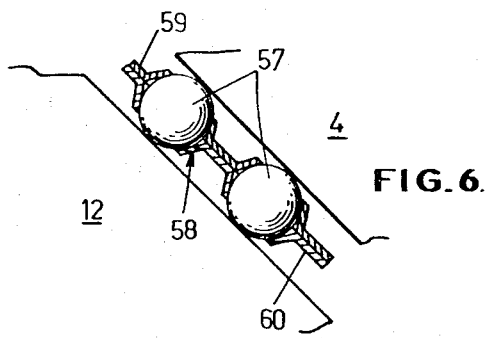
FIGURE 6 is a partial elevational view of a third form of embodiment of the device according to the invention.

FIGURE 6 shows a said component 4 and a member 12 between which are mounted spheres 57 maintained in recesses 58 made by welding dished sheets 59 and 60. These sheets may be maintained between the component 4 and the member 12 by one or more bosses, not shown, integral either with component 4 or with member 12, these bosses cooperating with corresponding openings provided in said sheets.

It is to be understood that the invention is in no way limited to the described forms of embodiment and that many modifications may be made to the latter without departing from the scope of the invention.

I claim:
1. A shock absorber for mounting between two elements, and comprising a first member mounted on one of said elements, at least one second member slidably mounted on the second of said elements, said first and second members having opposed faces beveled and parallel one to the other, spring means associated with one of said members to urge it towards the other, roller means provided between said opposed beveled faces of said members, said roller means being mounted for rotation about axes which are parallel to said opposed beveled faces and which are located within planes parallel to the direction of movement of said second member on said second element.

2. A shock absorber as claimed in claim 1, comprising at least one additional roller provided between said second member and said second element, the axis of rotation of said additional roller extending parallel to said opposed beveled faces of said second member and said second element and being located in a plane which is perpendicular to the direction of movement of said second member with respect to said second element.

3. A shock absorber as claimed in claim 1, wherein said roller means comprise groups of rollers, and further comprising a frame for each of said groups of rollers, and stop means provided on one of said members to limit the movement of the frames between said first member and said second member.

4. A shock absorber as claimed in claim 3, wherein said stop means are in the form of stopping bosses adapted to stop movement of said frames in a direction parallel to the axis of rotation of said rollers and in a direction parallel to the slanting of said opposed beveled faces.

5. A shock absorber as claimed in claim 1, wherein grooves are provided in said members and are adapted to guide said roller means.

6. A shock absorber as claimed in claim 1, wherein said roller means are formed by a plurality of groups of spheres provided between said opposed beveled faces and further comprising a frame for each group of spheres and having recesses for guiding said spheres, and further comprising bosses provided on one of said members to limit the movement of said frames between said first member and said second member.

7. A shock absorber as claimed in claim 1, further comprising resilient means mounted between said two elements.

8. A shock absorber as claimed in claim 7, wherein said resilient means comprises at least one coil spring.

9. A shock absorber as claimed in claim 8, wherein two of said springs are mounted between said elements, said springs being provided on either side of the device.

10. A shock absorber as claimed in claim 9, wherein the longitudinal axis of said springs are parallel and located in the symmetry plane of the device.

References Cited
UNITED STATES PATENTS

| | | | |
|---|---|---|---|
| Re.18,404 | 4/1932 | Holland | 267—9 X |
| 1,613,098 | 1/1927 | Harding | 267—9 |
| 2,053,990 | 9/1936 | Goodwin | 267—9 X |
| 2,141,767 | 12/1938 | Camp | 267—9 X |
| 2,652,244 | 9/1953 | Christenson | 267—9 |

ROY D. FRAZIER, *Primary Examiner.*

FRANK DOMOTOR, *Assistant Examiner.*